United States Patent [19]

Jones

[11] 3,781,116

[45] Dec. 25, 1973

[54] COLORIMETER WITH AUTOMATIC CUVETTE

[75] Inventor: Alan Richardson Jones, Miami, Fla.

[73] Assignee: Coulter Chemistry, Inc., Maunabo, P.R.

[22] Filed: Oct. 14, 1971

[21] Appl. No.: 189,312

[52] U.S. Cl. .............................. 356/180, 356/246
[51] Int. Cl. ......................... G01n 1/10, G01n 1/14
[58] Field of Search ........................... 356/180, 246;
350/315

[56] References Cited
UNITED STATES PATENTS
3,572,952   3/1971   Anthon .............................. 356/246
3,531,209   9/1970   Williamson et al. ................. 356/180

Primary Examiner—David Schonberg
Assistant Examiner—Paul K. Godwin
Attorney—Irving Silverman et al.

[57] ABSTRACT

A colorimeter with a source of light arranged to have its beam directed through the transparent walls of a cuvette to a photoresponsive device to measure the absorbance of the liquid in the cuvette. The cuvette is a cylinder of glass or the like having an upper central port in its upper cylinder head surrounded by an O-ring and a lower central port in its lower cylinder head connected with a depending probe. A free moving piston is movable in the chamber of the cuvette but has an outer diameter slightly less than the inner diameter of the cylinder. The upper port is adapted to be connected to a source of vacuum or pressure alternatively. When the probe is dipped into a body of liquid with the upper port connected to a source of pressure, the piston moves down to the bottom head of the cylinder and due to its dimensional difference relative to the wall of the cylinder, air escapes past the piston. The piston's bottom face does not accurately seat on the bottom cylinder head which contains the bottom port and hence the air also passes out of the lower port and through the probe into the body of liquid. This causes bubbles to be forced into the liquid and mixes the same. The upper port is then switched to a source of vacuum and with the application of vacuum above the piston, the atmospheric pressure on the liquid forces it to rise in the probe and into the lower port of the chamber. The inrush of liquid carries the piston upward because the space between the piston and the wall of the cylinder is substantially sealed by capillary action of the liquid. The piston is preferably formed of carbon and hence is normally of a specific gravity greater than that of the liquid, but it rises with the liquid on account of the capillary force mentioned. When the piston reaches the upper head of the cylinder, it is sucked against the O-ring and is sealed thereat. So long as vacuum is applied to the upper port this situation obtains. During this period of time with the chamber filled with liquid, the absorbance of the liquid is measured. Thereafter, the upper port is once more switched to a source of pressure. This drives the piston and liquid downward until the lower head is reached. The continued application of air pressure drives all vestiges of liquid past the piston due to its sloppy fit within the cylinder and out of the probe, clearing the cuvette and probe for the next test. The upper port may then be vented, if desired, leaving the piston at the bottom of the cylinder.

18 Claims, 4 Drawing Figures

PATENTED DEC 25 1973 3,781,116

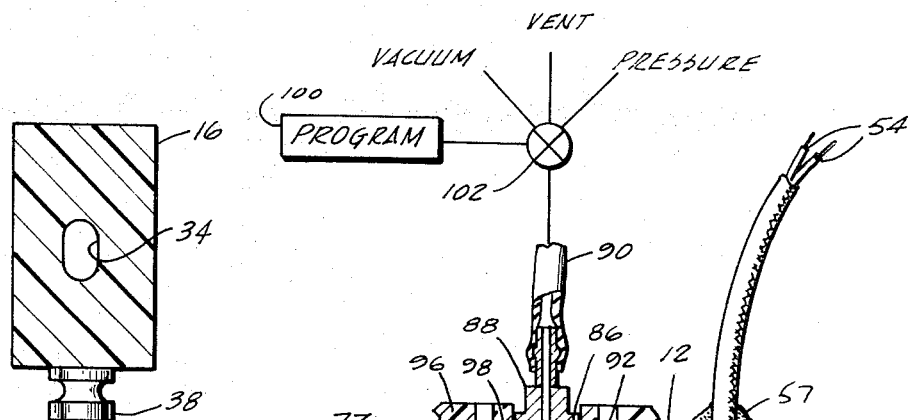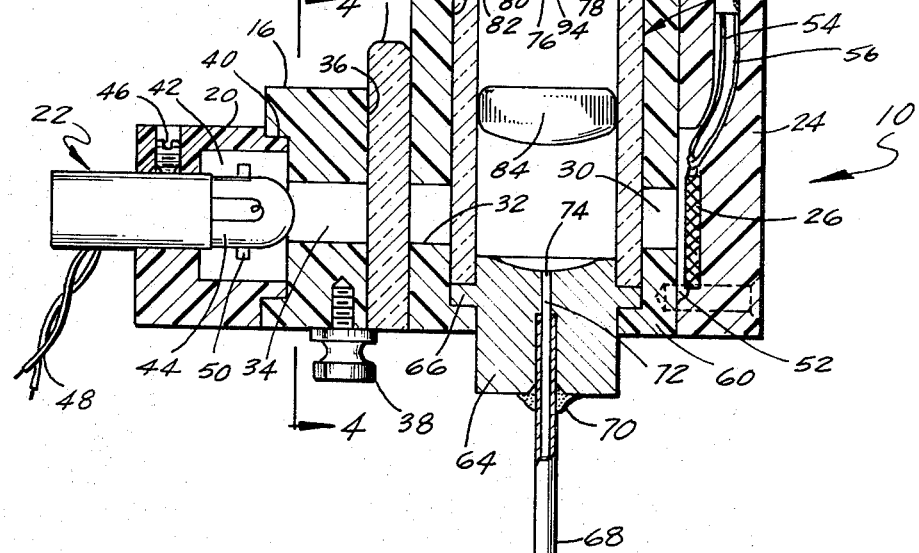

COLORIMETER WITH AUTOMATIC CUVETTE

BACKGROUND OF THE INVENTION

The technique of making chemical tests leading to colorimetric or spectrophotometric measurement of the resulting reactions is well known. The normal procedure is to mix the chemicals in a reaction tube and after a given time of incubation at some predetermined temperature pour a small quantity into a cuvette that is placed in the path of a beam of light of some specific wavelength. The reaction may be performed directly in the cuvette in some cases. The light passing through the cuvette is intercepted by a photoresponsive device whose electric current output is related to the amount of light which has been absorbed by the mixture. Obviously, the reaction is chosen to be one which will change in color with time to indicate some change in one of the chemicals, which may be, for example, blood serum of a particular patient. The untreated serum or some type of standard is used as a basis for the initial color value measured by the photoresponsive device for calibration or differential computation.

The practice of this technique requires considerable skill and there are many different types of apparatus used by biochemists and technicians to practice the same manually.

Among the precautions which must be observed in the practice of such techniques are the ensurance that the reagents have been thoroughly mixed before the colorimetric or spectro-photometric reading is taken and the prevention of contamination between determinations.

In recent years, great interest has been exhibited in the automatic performance of chemical tests of this type, using a plurality of different tests to be performed on an almost production line basis using, for example, sample serums drawn from a great many patients. A large hospital handling hundreds of patients requiring from one to twenty tests each daily has problems in logistics in addition to personnel difficulties to keep up with its testing. Large clinics and laboratories are faced with similar difficulties, and research projects requiring statistical determination of myriads of tests have tedious, time-consuming, expensive and difficult tasks. Such establishments have welcomed the advent of the so-called automatic chemistry apparatus.

The invention herein is especially intended for use with an automatic chemistry apparatus which handles a large number of different samples on a continuous testing basis. The reactions are carried on in reaction tubes, they must be mixed, withdrawn from the tubes into the cuvette, measured colorimetrically while in the cuvette, discharged from the cuvette and the cuvette rendered clean so that the next test can be conducted with a minimum of contamination. All of this must be done automatically and unattended and with reliability.

The structure of the invention is ideally suited for the requirements outlined above. It accomplishes the functions mentioned with efficiency and speed and uses a relatively simple structure involving only one moving part that has no mechanical connection to any other part of the apparatus other than that it freely slides within a cylinder.

SUMMARY OF THE INVENTION

A cylindrical transparent cuvette has an upper cylinder head with a central port surrounded by an elastomeric valve seat and a lower cylinder head having a central port. The lower port is connected to a depending fine bore probe. There is a free piston adapted to reciprocate within the cuvette having an outer diameter less than the inner diameter of the cuvette by capillary degree, adapted tightly to seat on the valve seat but sloppily to seat on the lower cylinder head. The upper port is adapted to be connected to a source of pressure and a source of vacuum alternatively. The cuvette is mounted in a housing which provides a source of light of a predetermined wavelength and a photoresponsive device, the beam of light being directed to pass through the cuvette to measure the absorbance of anything that is contained in the cuvette.

BRIEF DESCRIPTION OF THE DRAWINGS

FIG. 3 is a median sectional view taken generally along the line 3—3 of FIG. 2 and in the direction indicated; and FIG. 4 is a sectional view taken generally along the line 4—4 of FIG. 3 and in the direction indicated.

DESCRIPTION OF THE PREFERRED EMBODIMENT

Figure 2:
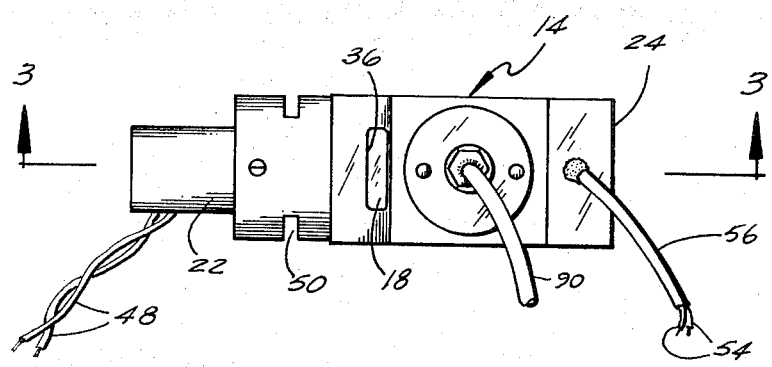
FIG. 2 is a top plan view of the same.
Figure 1:
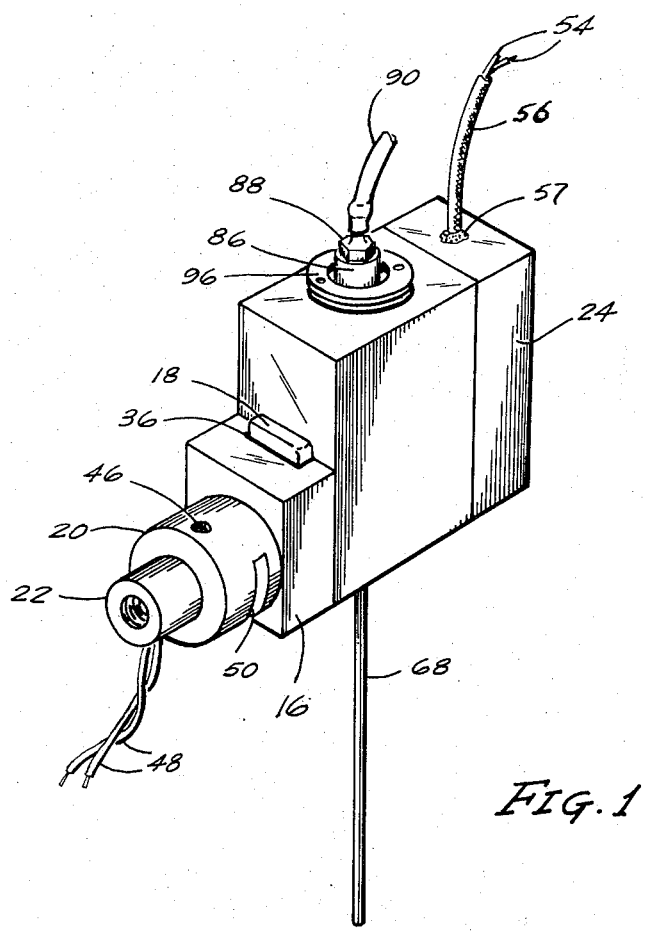
FIG. 1 is a generally perspective view of the colorimeter and cuvette of the invention.

The invention is embodied in a colorimeter and cuvette construction designated generally by the reference character 10. There is a housing 12 which contains the cuvette 14, a second housing 16 which contains the optical interference filter 18, a third housing 20 which contains the source of light 22 and a fourth housing 24 which contains the photoresponsive device 26.

All of the housings are shown as separate blocks of synthetic resin or any other suitable material assembled and secured together, but obviously the number of such parts or housings may be decreased by construction of a composite housing of lesser number of pieces. The illustrated structure is made of simple geometric shapes easily cut and machined and requiring very little expense by way of molds and dies.

The arrangement for passing a beam of light through the cuvette is relatively straightforward and simple. The cuvette 14 includes a glass cylinder 28 set into a suitable mating cavity 58 formed in the housing or block 12. Right and left lonzenge-shaped optical passageways 30 and 32, respectively, are cut through the walls of the housing 12. The housing 16 has a passageway 34 of the same configuration as those just mentioned and aligned therewith, passing transversely through the housing 16. A vertical slot 36 cut in the housing 16 slidably accommodates the interference filter 18 which may be replaced from the top of the slot 36, a stop member 38 preventing its moving out of the bottom thereof.

The light housing 20 is cylindrical member seated in a shallow recess 40 formed in the left-hand face of the housing 16 and provided with an internal cylindrical chamber 42 to accommodate the bulb 44 of the light source 22. A setscrew 46 keeps the light source 22 in any adjusted position, wires 48 lead to a source of electric power therefor and slots 50 are provided in the housing 20 to keep the bulb 44 cool and enable one to see whether it is burnt out. The bulb filament is aligned with the passageway 34. The bulb may be prefocussed or there may be an optical collimating structure between it and the photoresponsive device 26.

The inner face of the housing 24 has a recess 52 into which the photoresponsive device 26 is set. It may be cemented in position, held in place by suitable stop protuberances or otherwise held and arranged to receive the beam of light emerging from the passageway 30 after having passed through the cuvette cylinder 28. Suitable electric wires 54 connected with the pnotoresponsive device 26 pass through a conduit 56 formed in the housing 24 and emerge at the top thereof, being sealed in the housing 24 by suitable cement at 57. The signal from the photoresponsive device 26 passes to electronic circuitry of well-known construction to measure absorbance.

The cuvette 14, as previously mentioned, includes a glass cylinder 28 that is arranged with its axis vertical, being set into a suitable cylindrical bore 58 provided in the housing 16. The lower end of the bore has a reduced diameter portion providing an annular shouldered flange 60 and the upper end is threaded at 62. The cylinder has a lower annular cylinder head 64 telescopically engaged in the bottom end of the cylinder 28 and having an annular radially outwardly extending flange 66 forming an upper shoulder for the seating of the lower end of the glass cylinder 28 and itself overlying the shouldered flange 60. The connection of the lower end of the glass cylinder 28 with the cylinder head 64 is sealed in any suitable manner. A substantial portion of the body of the lower cylinder head 64 protrudes from the bottom of the housing 12 and carries a stainless steel probe 68 engaged in the center thereof and sealed by cement 70. The bore of the probe 68 is aligned with a central small bore passageway 72 provided in the head 64 that opens to a lower port 74 in the slightly dished inner face of the head 64.

The upper end of the glass cylinder 28 is telescopically engaged on the upper cylindrical head 76 which has a flange 77 to which said upper end is sealed. The upper cylinder head 76 has a reduced diameter portion 78 forming its interior face thereby forming an annular groove 80 within the glass cylinder and an elastomeric O-ring 82 is seated in the groove 80. The face of the portion 78 is axially recessed relative to the O-ring 82 so that the piston 84 may seat against the O-ring 82 in a valving action.

The upper end of the cylinder head 76 has a spigot 86 which is interiorly threaded to receive a hollow pressure fitting 88 by means of which a conduit 90 can be connected to the fine bore passageway 92 that passes axially through the upper cylinder head 76 and opens to the central port 94. A large plug 96 with a central hole to pass the spigot 86 is screwed into the threaded upper end 62 of the bore 58 and in conjunction with the ring gasket 98 holds the cuvette 14 in place. The conduit 90 is adapted to be connected alternately to a source of vacuum and a source of air pressure, with suitable valve means which may include means for venting the conduit also. As shown, the operation of the colorimeter-cuvette is controlled by programming means 100 operating a valve 102 that connects the conduit 90 to any one of the vacuum source, pressure source or vent to atmosphere.

The piston 84 which has been referred to is free moving. Its diameter uniformly is less than the interior diameter of the glass cylinder 28 by capillary dimensions. Typically, the clearance is of the order of 0.0005 inch.

The interior surface of the glass cylinder and the exterior surface of the piston 84 are required to be very accurately finished to maintain the relationship. The cylinder must be transparent to the wavelength of the light which will pass through its wall. The dimensional tolerance on the interior is typically 0.0002 inch TIR. It also must withstand the chemical reactions and temperatures of the samples which it will handle, as will be required of all of the parts of the cuvette 14. The piston 84 and the cylinder heads 64 and 76 are ideally made of carbon because of inertness, dimensional stability, lack of abrasiveness and low coefficient of expansion.

The fit of the lower end face of the piston 84 with the inner end face of the cylinder head 64 is sloppy, that is, air and liquid can freely pass the piston 84 even when it is seated at the bottom of the cylinder 28.

Although referred to as a piston, the member 84 does not act as a true piston but is primarily a valve. This will be understood from a description of the operation of the apparatus 10.

Initially, it may be considered that the programming means 100 has operated the valve 102 to connect the conduit 90 to the atmosphere, that is, it is vented. The piston 84 is at the bottom of its stroke seated against the inner surface of the cylinder head 64. Now a reaction vessel (not shown) is brought up to the probe 68 and the lower end of the probe enters the body of liquid in the vessel. The programming means 100 now operates the valve 102 to connect the conduit 90 to the source of air pressure. Air enters the cylinder 28 by way of the upper port 94, passes through the cylinder and streams past the piston 84 and out through the port 74 and into the probe 68, causing a bubbling to occur in the reaction vessel. This continues for a time until the sample in the reaction vessel is thoroughly mixed. Then the programming means 100 operates the valve 102 to connect the conduit 90 to a source of vacuum. The atmospheric pressure on the exterior of the body of liquid in the reaction vessel now forces liquid to move into the bore of the probe 68 and out of the port 74 into the interior of the cylinder 28. The liquid rises alongside of the piston 84, seals the space between the piston and the glass wall and the piston now rises passively with the rising liquid.

The speed of rise is, of course, controlled by the relative pressure produced by the vacuum source. This must be sufficient to cause the liquid to rise rapidly within the cylinder to prevent any substantial amount from streaming past the piston. Too slow a rise will leave the piston seated at the bottom of the cylinder while the liquid rises in the cuvette above it.

The piston rises until it reaches the top of the cylinder 28 at which point its upper surface comes into engagement with the O-ring 82 and is seated thereagainst in a valving action by suction of the vacuum source. In the meantime, air was being drawn out of the cylinder by way of the upper port 94. With the piston 84 seated, liquid stops entering the cylinder 28 and so long as the vacuum is maintained the piston 84 will be in closed valve position at the top of the cylinder 28. During this time, the programming means 100 may call for a reading of the response of the photoresponsive device 26 to be taken. This device may be in the form of a gridded silicon photocell generating a current and the circuitry coupled therewith may include temperature compensated field effect transistors and amplifiers for converting the current to voltage for measurement, etc.

Reference to colorimetric measurements should be taken to include spectrophotometric measurements. The light source could be any monochromator such as a lamp with an interference filter.

After the measurement has been made, the programmer 100 turns the valve 102 to the source of pressure once more and air enters the port 94. The piston 84 and the liquid within the cylinder 28 are both forced downward as fast as the the fluid can escape by way of the port 74 and the probe 68 back into the reaction vessel or into a waste receptacle. When the piston 84 reaches the bottom of the cylinder 28 and seats on the head 64, air continues to pass through the cylinder and past the piston. This air cleans the walls of the cylinder and also blows all of the moisture out of the cuvette 14 due to the imperfect or sloppy fit of the piston 84 on the head 64. The probe 68 is also cleaned out by the stream of air.

After this has occurred, and when it is certain that the cuvette 14 is free from all moisture, the programmer 100 operates the valve 102 to connect it to the atmosphere and the apparatus 10 is ready for the next sample. The reaction vessel or waste receptacle has been removed from the probe 68 while the air pressure was still applied.

Obviously, details may be varied without departing from the spirit or scope of the invention as defined in the appended claims.

What it is desired to secure by Letters Patent of the United States is:

1. A cuvette for use in photometric examination of fluid samples comprising: a cylinder having upper and lower cylinder heads, said upper cylinder head having an upper central port, means defining a valve seat about said upper central port to enable said port to be closed, said lower cylinder head having a lower central port, a depending hollow probe connected to said lower port, a free pistonlike cylindrical member disposed within said cylinder and adapted to reciprocate between said ports, said pistonlike member having, along its height, a uniform outer diameter which is less than the inner diameter of said cylinder by a uniform capillary degree, said pistonlike member capable of sealingly engaging said valve seat but sloppily engaging the lower cylinder head whereby to permit both gaseous and liquid fluid to pass when so engaged with the lower cylinder head, said upper port being connectable to a source of pressure and to a source of vacuum alternatively.

2. The cuvette as claimed in claim 1 in which said means defining said valve seat comprises an annular groove formed in the interior face of said upper cylinder head and an elastomeric ring seated in said groove, the thickness of said ring being sufficient to enable said ring to extend outward of said groove for engagement sealingly with said pistonlike member.

3. The cuvette as claimed in claim 1 and, in combination therewith, a source of air pressure, a source of vacuum, and venting means connected to the atmosphere, valving means coupled to said pair of sources and venting means, and conduit means leading between said upper port and said valving means, said valving means comprising at least a three position valve operable selectively to couple said conduit means to one or the other of said sources or to said venting means.

4. The cuvette as claimed in claim 1 and, in combination therewith, housing means accommodating said cuvette therein, a source of light, a photoresponsive device, and means for generating a beam of light of predetermined wavelength, said light source, said generating means and said pnotoresponsive device arranged respectively to pass a beam of light through said cuvette transverse to the axis thereof and to receive said beam directly after passage thereof through said cuvette and its contents, said beam generating means comprising an interference filter and collimating means disposed within said housing means between said light source and said cuvette.

5. The cuvette as claimed in claim 1 in which said upper cylinder head is seated at the upper end of the cylinder closing off same but for the port defined therein, said upper head having inner and outer faces, said outer face having an interiorly threaded spigot portion and a pressure fitting threadably engaged therein and including means for coupling a conduit thereto.

6. The cuvette as claimed in claim 5 wherein said means defining a valve seat comprise a reduced diameter portion on the inner face of said upper head and elastomeric material seated within the groove defined thereby.

7. The cuvette as claimed in claim 3 and, in combination therewith, housing means accommodating said cuvette, a source of light and a photoresponsive device therein, said light source and said photoresponsive device arranged respectively to pass a beam of light through said cuvette transverse to the axis thereof and to receive said beam directly after passage thereof through said cuvette and its contents.

8. A colorimeter for use in the photometric examination of fluids and comprising housing means constructed and arranged to accommodate therein a transparent cylindrical cuvette, a source of light and means arranged to direct a beam of light from said source transversely through said cuvette and a photoresponsive device arranged to receive the beam of light directly from said cuvette and to generate electrical signals responsive to said beam, said cuvette having means for successively introducing liquid sample thereinto and discharging liquid sample therefrom witout interfering with said light source and photo-responsive device but maintaining discrete separation between successive liquid samples, said introducing means includes a freely reciprocable piston disposed within said cuvette and being movable between the opposite ends of said cuvette, means at the upper end of the cuvette to establish a sealed condition with the piston and means at the lower end of the cuvette to receive the piston in engagement therewith but to permit passage of fluid therepast during said engagement, coupling means at the upper end of the cuvette adapted for communication with sources of vacuum and gaseous fluid pressure, means at the lower end of the cuvette to establish communication between the cuvette and a source of liquid sample, the relative inner and outer diameters of the cuvette and the piston differing by capillary degree uninterruptedly over the circumference and height of said piston whereby to establish a liquid seal therebetween albeit to permit passage of gaseous fluid therepast.

9. The colorimeter as claimed in claim 8 in which there is provided a source of gaseous fluid pressure, a source of vacuum and venting means to the atmosphere, and said coupling means comprise conduit means leading between said sources and venting means and the upper end of the cuvette, and multiposition valving means for selectively applying gaseous fluid pressure and vacuum from said source alternatively to the piston whereby alternatively to purge from and to fill said cuvette with liquid sample, said valving means including a venting position to establish communication of the cuvette with said venting means.

10. The colorimeter as claimed in claim 9 in which said cuvette has means at the upper and lower ends closing off the interior thereof but for central parts formed respectively therein, means for establishing a sealed relationship with said pistonlike member at the upper end of the cuvette closing off the upper central port and said piston being engageable in a nonsealing relationship with the lower end of the cuvette over the lower central port, and probe means coupled with said lower port to establish communication between the cuvette interior and a source of liquid sample.

11. A colorimeter for use in the photometric examination of fluids comprising a plurality of modular housings arranged coupled operatively one to the others, one of said housings including a cylindrical bore formed therein and a cylindrical transparent cuvette seated within said bore, means closing off said upper and lower ends of said cuvette except for central ports in each, a source of positive gaseous fluid pressure, a source of negative gaseous fluid pressure, valving means coupled operatively to said pair of sources, conduit means coupled to the upper port and to said valving means, said valving means constructed and arranged alternatively and selectively to connect one or the other of said sources to said upper port by way of said conduit means, depending hollow probe means secured fixedly to said lower end of said cuvette in communication with the lower one of said ports and arranged to communicate with a liquid test sample, said means closing off the upper end of said cuvette comprising a cylinder head seated sealably over said upper end, means defining an elastomeric valve seat about said upper port, a piston reciprocable within said cuvette between a position sealably engaged with said valve seat and a position engaging said means closing off said lower end in a sloppy fit therewith, said piston comprising a cylindrical body having, along its height, a uniform outer diameter which is less than the inner diameter of the cylinder by a uniform capillary degree over the full circumference thereof whereby to enable gaseous fluids to flow therepast albeit to establish a liquid seat between the piston and the inner wall of the cylinder during the presence of liquid within the cylinder so that gaseous and liquid fluid passage past said lower end is permitted during engagement of said piston with said lower end.

12. The colorimeter as claimed in claim 11 in which a second housing includes means for mounting therein a source of light of predetermined wavelength, said second housing being coupled to said first housing whereby to direct light from said source laterally to said cuvette; a third housing carrying a photoresponsive device and operatively coupled to said first housing at a location, relative to said cuvette, diametrically opposite to said light source whereby light passing transversely through the cuvette will be received by said photoresponsive device, electrical connector means coupled between said photoresponsive device and the exterior of said third housing, and electrical signal receiving means connected to said electrical connector means for receiving electrical signals generated by said photoresponsive device.

13. The colorimeter as claimed in claim 11 and programming means for operating said valve means in a predetermined cycle to enable introduction of positive gaseous fluid pressure to said cuvette and past said piston means to said probe means for introduction to the liquid sample to mix same, thereafter to enable application of negative pressure to said cuvette causing said piston means to move to the upper end of said cuvette and terminate in sealed engagement with said valve seat whereby liquid sample entering said cuvette defines by capillarity a liquid seal between said piston means and the cylinder wall, and lastly to enable positive gaseous fluid pressure to be applied said cuvette to drive said piston means toward engagement with said means closing off the lower end of the cylinder, and to introduce gaseous fluid between said piston means and said cylinder wall to said probe means, said gaseous fluid pressure flow continuing notwithstanding the engagement of said piston with said last-mentioned closing off means.

14. A transparent cylindrical cuvette for use in the photometric examination of fluids comprising a cylinder, means at the upper and lower ends of said cylinder for closing off same except for central ports defined respectively therein, a freely reciprocable piston disposed within said cylinder between said ends and capable of movement between a sealed condition with the upper end of the cylinder closing off its port to nonsealed engagement with the lower end of the cylinder, said piston comprising a cylindrical body having, about its height, a uniform outer diameter so that its circumference is less than the inner diameter of said cylinder by a uniform capillary degree for establishing a liquid seal between said body and said cylinder wall during the presence of liquid within the cylinder albeit to permit passage of gaseous fluid past said piston, means for coupling the upper end of said cylinder to sources of positive and negative fluid pressure respectively and means for coupling the lower end of the cylinder to a source of liquid sample, whereby positive pressure applied to the piston purges the cylinder of its contents and negative pressure applied to the piston causes the piston to assume its sealed condition filling the cylinder with liquid sample from the source thereof.

15. The cuvette as claimed in claim 14 in which said lower cylinder head has an inner face constructed and arranged to establish a sloppy engagement with the piston whereby to enable passage of liquid and gaseous fluid therepast notwithstanding engagement of said piston therewith.

16. A method of photometric analysis of liquid samples by directing a beam of light through a transparent examining chamber carrying said sample and measuring the absorbance by means of a photoresponsive device arranged directly to receive the beam after its passage through said chamber and the chamber having a piston freely movable therein between a sealed condition at one end thereof and a nonsealed condition at the other end and probe means are provided for introduction into a source of liquid sample and communicating to said other end, said method comprising the steps of:

first introducing the probe means into the source of liquid sample, then introducing pressurized air to said one end of the piston depressing same to its nonsealed condition at the other end, continuing to direct said pressurized air past the piston into the liquid sample source by way of the probe means to agitate and mix same, next applying vacuum to said one end of the piston raising said piston to its sealed condition thereby carrying liquid sample from the source into the examining chamber, thereafter maintaining the vacuum while measuring the absorbance during maintenance of vacuum and lastly, reintroducing said pressurized air to said one end again depressing the piston to effect exhausting the liquid sample from the examining chamber and simultaneously cleaning the walls of said examining chamber.

17. The method as claimed in claim 16 and venting the examining chamber to the atmosphere following the exhausting of the liquid sample from said chamber.

18. A transparent cylindrical cuvette for use in the photometric examination of fluids comprising a cylinder, means at the upper and lower ends of said cylinder for closing off same except for central ports defined respectively therein, a freely reciprocable piston disposed within said cylinder between said ends and capable of movement between a sealed condition with the upper end of the cylinder closing off its port to nonsealed engagement with the lower end of the cylinder, means for coupling the upper end of said cylinder to sources of positive and negative fluid pressure respectively and means for coupling the lower end of the cylinder to a source of liquid sample, whereby positive pressure applied to the piston purges the cylinder of its contents and negative pressure applied to the piston causes the piston to assume its sealed condition filling the cylinder with liquid sample from the source thereof, said means closing off said cylinder ends comprising cylinder heads respectively secured to said ends, each of said cylinder heads having a small passage therethrough defining said ports, the upper one of said cylinder heads having an inner face defining a groove and an elastomeric material seated within said groove and extending outwardly therefrom, said piston adapted to engage said elastomeric material to assume the sealed condition at the upper end of the cylinder.

* * * * *

UNITED STATES PATENT OFFICE
CERTIFICATE OF CORRECTION

Patent No. 3,781,116      Dated December 25, 1973

Inventor(s) ALAN RICHARDSON JONES

It is certified that error appears in the above-identified patent and that said Letters Patent are hereby corrected as shown below:

Column 2, line 58, insert --a-- after "is"; column 3, line 9, "pnotore" should be --photore--; column 7, line 2, "source" should be --sources--; column 7, line 49, "seat" should be --seal--.

Signed and sealed this 5th day of November 1974.

(SEAL)
Attest:

McCOY M. GIBSON JR.          C. MARSHALL DANN
Attesting Officer            Commissioner of Patents